(12) United States Patent
Patro et al.

(10) Patent No.: US 8,380,593 B1
(45) Date of Patent: *Feb. 19, 2013

(54) SYSTEM, METHOD, AND COMPUTER PROGRAM FOR DYNAMICALLY ALTERING A RATING BASED ON NETWORK CONDITIONS

(75) Inventors: Debabrata Patro, Pune (IN); Menachem Domb, Ramat Gan (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/348,600

(22) Filed: Jan. 5, 2009

(51) Int. Cl.
*G07F 19/00* (2006.01)
*G06F 15/02* (2006.01)
*G06Q 40/00* (2006.01)
*H04M 15/00* (2006.01)

(52) U.S. Cl. ......... 705/34; 705/32; 705/40; 379/114.03; 379/121.02; 379/127.05

(58) Field of Classification Search ................ None
See application file for complete search history.

(56) References Cited

U.S. PATENT DOCUMENTS

| 7,487,237 B2 * | 2/2009 | Lloyd et al. ............... 709/224 |
| 2006/0008064 A1 * | 1/2006 | Sangillo ................. 379/114.08 |
| 2008/0085707 A1 * | 4/2008 | Fadell ....................... 455/435.3 |
| 2008/0192820 A1 * | 8/2008 | Brooks et al. ............ 375/240.02 |

* cited by examiner

*Primary Examiner* — Fahd Obeid
(74) *Attorney, Agent, or Firm* — Zilka-Kotab, PC

(57) ABSTRACT

A system, method, and computer program product are provided for dynamically altering a rating based on network conditions. In operation, at least one aspect of a condition of a network is identified. Furthermore, a rating in association with an event is dynamically altered, based on the at least one aspect of the condition of the network.

18 Claims, 6 Drawing Sheets

SYSTEM, METHOD, AND COMPUTER PROGRAM FOR DYNAMICALLY ALTERING A RATING BASED ON NETWORK CONDITIONS

FIELD OF THE INVENTION

The present invention relates to event rating, and more particularly to dynamically rating events.

BACKGROUND

Currently, the rating or pricing of communication services is implemented as a static plan that is established before any activity (e.g. calling, etc.) associated with the communication service occurs. This static rating is typically implemented as part of a predefined rate plan and does not consider any specific situation of a network at the time of the activity. There is thus a need for addressing these and/or other issues associated with the prior art.

SUMMARY

A system, method, and computer program product are provided for dynamically altering a rating based on network conditions. In operation, at least one aspect of a condition of a network is identified. Furthermore, a rating in association with an event is dynamically altered, based on the at least one aspect of the condition of the network.

DETAILED DESCRIPTION

Figure 1:
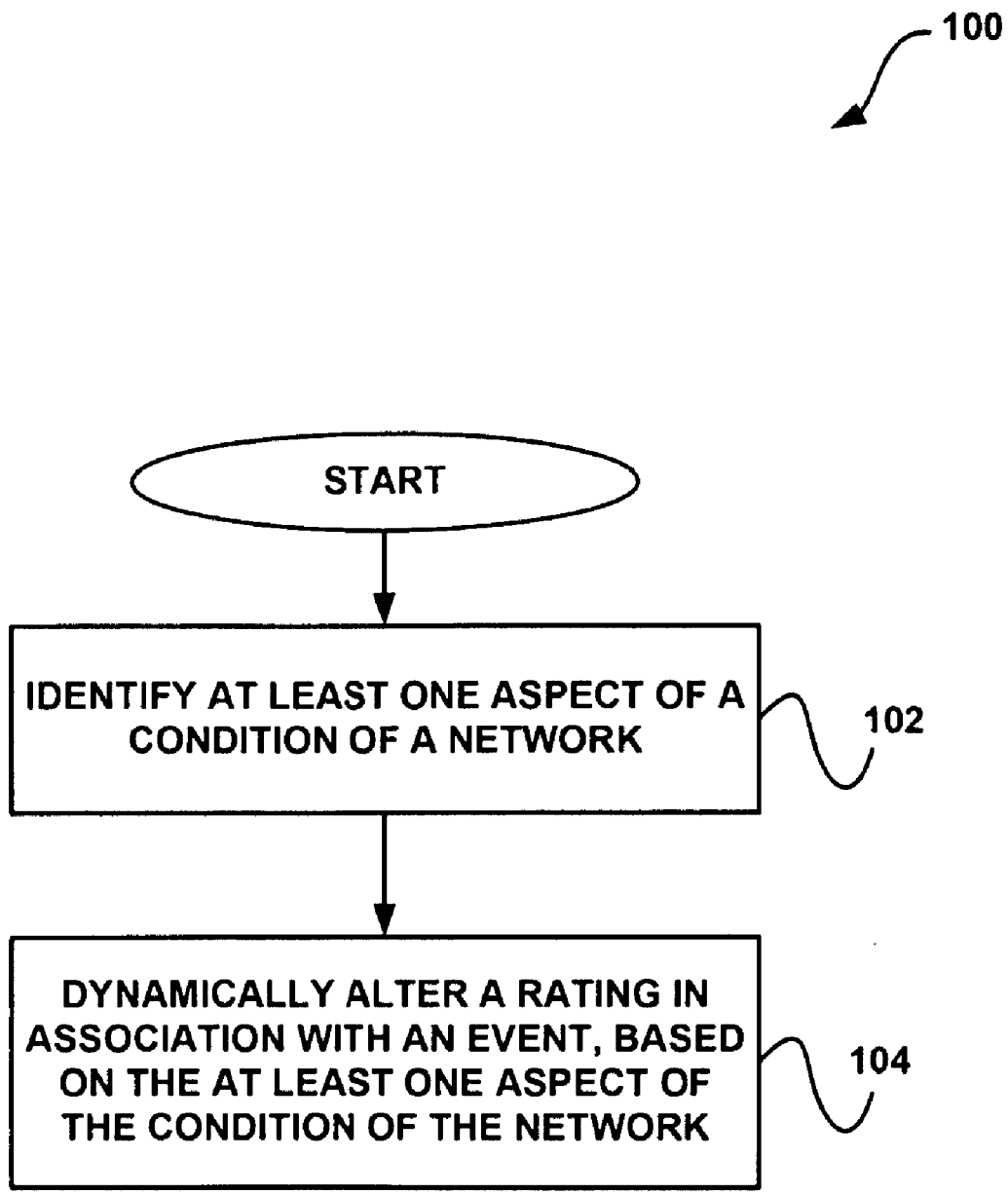
FIG. 1 shows a method for dynamically altering a rating based on network conditions, in accordance with one embodiment.

FIG. 1 shows a method 100 for dynamically altering a rating based on network conditions, in accordance with one embodiment. As shown, at least one aspect of a condition of a network is identified. See operation 102.

The network may include any network. For example, in various embodiments the network may include a telecommunications network, a local area network (LAN), a wireless network, a wide area network (WAN) such as the Internet, peer-to-peer network, cable network, and various other networks. Furthermore, the at least one aspect of a condition of the network may include any aspect of a condition such as a load on the network, a current capacity of the network, a health of the network, and/or any other aspect of a condition of the network.

As shown further in FIG. 1, a rating in association with an event is dynamically altered, based on the at least one aspect of the condition of the network. See operation 104. In the context of the present description, an event refers to any event capable of being rated. For example, in various embodiments, the event may include a voice call, a data transmission such as a download, a short message service (SMS) message, and/or any other event.

Furthermore, in the context of the present description, a rating refers to a determined cost or rate of an event. For example, the rating may include a charging scheme. In one embodiment, the rating may include a predefined rate agreed upon by a customer and a service provider. In this case, the predefined rating in association with the event may be dynamically altered, based on the at least one aspect of the condition of the network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
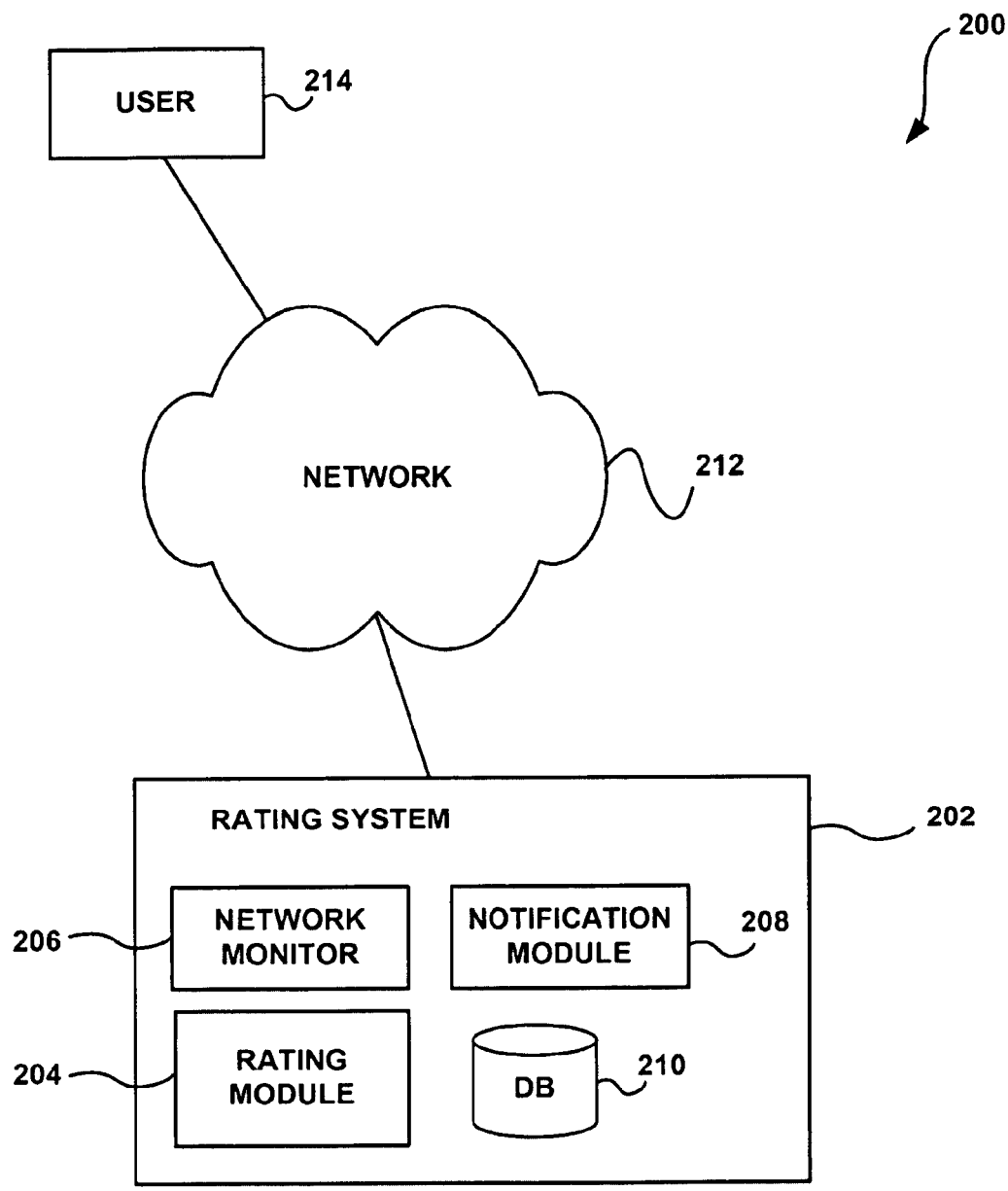
FIG. 2 shows a system for dynamically altering a rating based on network conditions, in accordance with one embodiment.

FIG. 2 shows a system 200 for dynamically altering a rating based on network conditions, in accordance with one embodiment. As an option, the system 200 may be implemented in the context of the details of FIG. 1. Of course, however, the system 200 may be implemented in any desired environment. It should also be noted that the aforementioned definitions may apply during the present description.

As shown, a rating system 202 is provided. The rating system 202 includes a rating module 204 capable of rating events. In this case, the rating module 204 may include any module capable of implementing rating logic.

As shown further, the rating system 202 may also include a network monitor 206. The network monitor 206 may include any hardware or software capable of monitoring a condition of a network and optionally, predicting the condition of the network in the coming time period. For example, the network monitor 206 may include hardware and/or software for monitoring a load on a network, a current capacity of a network, a health of a network, and/or any various other aspects of a network.

The rating system 202 may also include a notification module 208. The notification module 208 may be utilized to generate and send notifications associated with ratings and rating changes. A database 210 may also be included as a component in the rating system 202. In this case, the database 210 may represent any type of memory capable of storing data.

It should be noted that, in various embodiments, the rating system 202 may include additional components. Furthermore, the components of the rating system 202 may be configured as the same or separate modules. Still yet, the inclusion of the components and functionality described in the context of FIG. 2 may vary in different embodiments.

The rating system 202 is in communication with a network 212. The network 212 may include a telecommunications network, a local area network, a wireless network, a wide area network such as the Internet, peer-to-peer network, cable network, and various other networks.

In operation, at least one aspect of a condition of the network 212 may be identified utilizing the network monitor 206. In this case, the aspect of the network condition may include a load of the network 212. Utilizing load as a parameter, the rating module 204 may determine a rate of an event, based on the load of the network 212. For example, the load may be a real-time parameter that may be assessed by the rating system 202 and any network elements, and may be used as a rating/charging parameter without a need to change a pricing scheme in a product catalog.

In some cases, online charging and other components (e.g. Q-Pass components, etc.) may be part of a real-time service delivery system. These architectures may be aware of the load on their systems and may be able to detect information about load on the overall communication network. This information may be used to determine when the network usage is below a threshold.

Similarly, this information may be used to determine when the network usage is outside of a typical range of usage and/or damaged or disabled at a geographical location. This determination may be utilized to provide information such as areas and locations where the network has low utilization. Furthermore, usage trends may be developed in addition to data indicating whether network use is increasing or decreasing.

Using this information, a notification may be sent to the user 214 or other relevant subscribers about an applicable lower tariff (e.g. a lower tariff being applicable for the next several minutes, etc.), rate discounts for calls, and/or rate discounts for other events. In one embodiment, the notification module 208 may be utilized to send the notification. Furthermore, event information and rating information may be made available to the rating system 202.

Once an event request or event information is received by the rating system 202, the rating system 202 may use information related to applicable lower tariffs to give a discounted rate for the relevant events (e.g. calls, etc.).

This dynamic rating may be applied to analog and digital content delivery, including, but not limited to, ringtones, music downloads, video on demand, etc. For example, when the user 214 (e.g. a subscriber, etc.) makes a purchase and wants to receive the purchased content, the rating system 202 may utilize the network monitor 206 to monitor the load of the network 212 and optionally predict the load on the network in the upcoming period. If the load on the network 212 is high, the rating system 202 may dynamically (e.g. automatically, etc.) offer the user 214 the opportunity to receive a deferred download, view the content at a specific time, and/or download the content in a specific time window in exchange for a discounted rate. In this case, if the user 214 accepts the offer, the rating system 202 may schedule the download, establish a viewing at a particular time, or allow the download within a time window, while dynamically establishing a rating for such event.

In this way, a network asset may be used more efficiently and more uniformly such that the load on the network 212 may be managed while giving a better rate and/or a better quality of service to subscribers. Thus, the rating system 202 may be utilized to provide communication services (e.g. calls, SMS messages, downloads, etc.) at a rating that may be defined initially as part of a rate plan and also take into account a specific situation of the network 212 at the time of the event. In addition to options such as off-peak call rates and night time unlimited download at a pre-defined rating/charging scheme, network conditions on specific days and at specific times may be considered.

Figure 3:
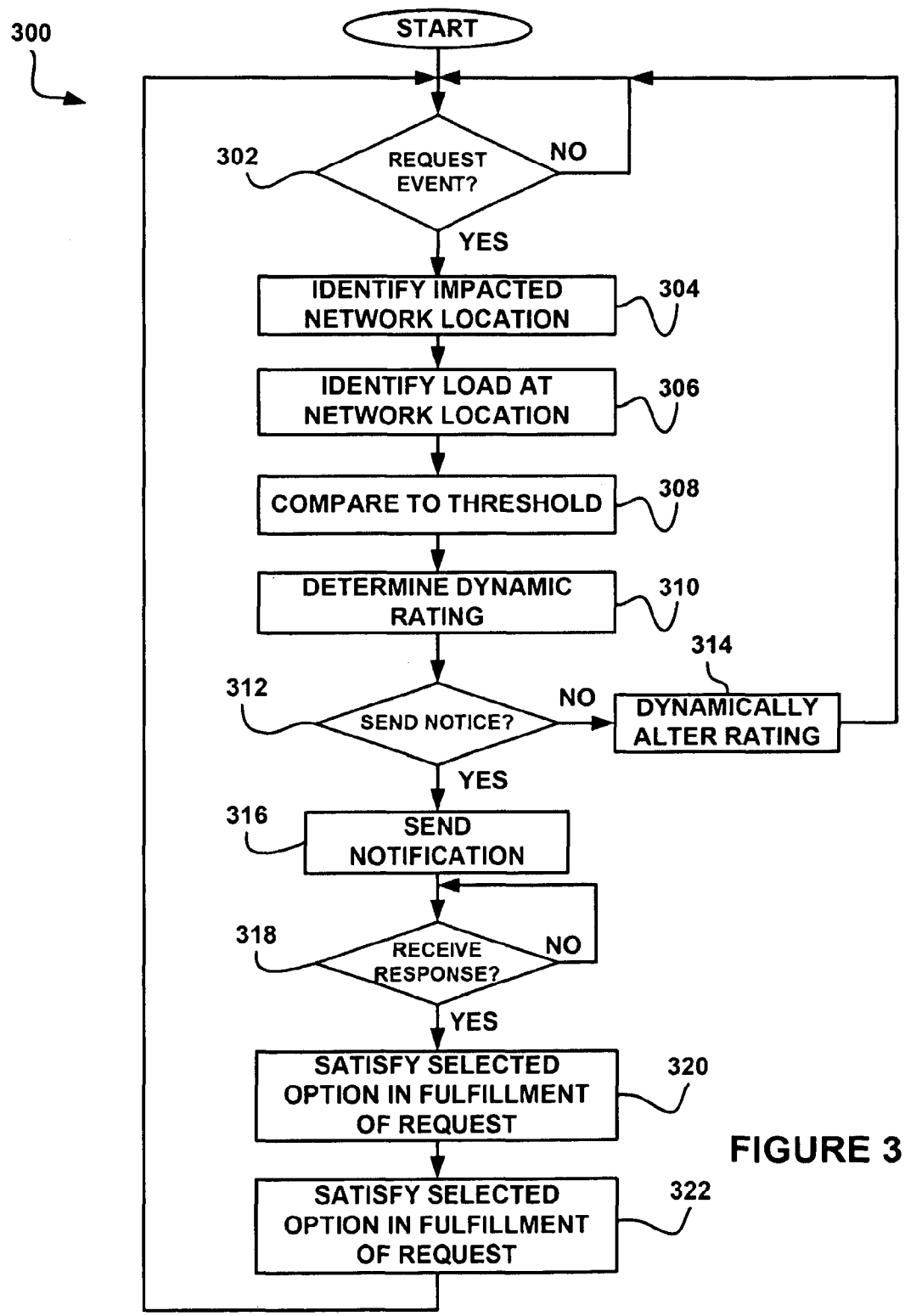
FIG. 3 shows a method for dynamically altering a rating based on network conditions, in accordance with another embodiment.

FIG. 3 shows a method 300 for dynamically altering a rating based on network conditions, in accordance with another embodiment. As an option, the method 300 may be implemented in the context of the details of FIGS. 1-2. Of course, however, the method 300 may be carried out in any desired environment. Further, the aforementioned definitions may equally apply to the description below.

As shown, it is determined whether there is a request for an event. See operation 302. The request for the event may include a request for the initiation of a voice call or data transfer, for example. In one embodiment, computer code may be provided as part of a system receiving the request for identifying the request for the event. Ultimately, a rating of the event may be dynamically altered in response to the request.

If a request for an event is detected, an impacted network location is identified. See operation 304. For example, a portion of the network associated with the event may be determined.

At least one aspect of a condition of the impacted network is identified. See operation 306. In this case, a load of the impacted network location may be identified.

Thus, the identification of at least one aspect of the condition of the network may include determining a portion of the network associated with the event and the identification of at least one aspect of the condition of the portion of the network, in response to the event request. Furthermore, the at least one aspect of the condition of the network may be identified before the event occurs.

Once the at least one aspect of the condition of the network is identified, which in this case is the load of the network, the at least one aspect of the condition may be compared to at least one predetermined threshold. See operation 308. The predetermined threshold may include any predetermined threshold.

For example, the threshold may include a network usage threshold. In this case, the network usage threshold may include a threshold indicating a low amount of use or a threshold indicating a high amount of use. A rating in association with the event is then determined based on the comparison. See operation 310.

It is then determined whether to send a notice to a user that the rating in association with the event may be altered. See operation 312. This determination may be based on a variety of factors such as a user preference, a user configuration, the type of event, the potential change in the rating, and/or any other factor.

In one embodiment, if the rating associated with the event is to be increased, it may be determined to send a notification to the user. In this case, if the rating associated with the event is to decrease, it may be determined that no notification is to be sent to the user. Furthermore, it may be determined that a notice is to be sent to a user if additional rating options are available.

If it is determined not to send a notice to the user, the rating is dynamically altered based on the comparison of the at least one aspect of the condition to the at least one predetermined threshold. See operation 314. If it is determined that a notice is to be sent to the user, the notice is sent to the user. See operation 316. In this case, the notice may include information indicating the potential alteration of the rating.

The notification may be sent in a variety of ways. For example, in one embodiment, the notification may be sent a manner consistent with the event request. In this case, if the event request includes a call, the notification may be sent to a device used to initiate the potential call. If the event request includes a download, the notification may be sent to a device where the download request was initiated.

In any case, the notification may be a visual and/or an audio notification. For example, the notification may include an automated voice notification including information associated with the potential rate alteration. Additionally, the notification may include an information window including information associated with the potential rate alteration.

The notification may also include a mechanism for initiating a response. For example, the notification may include a voice prompt for a response. Additionally, the notification may include a user interface used to initiate a response. In this case, the user interface may include a button such that the user may respond utilizing the button.

Thus, a notification may be provided to a user associated with the event, based on an impact on rating calculated based on at least one of a monitored and a predicted load on the network. Further, the notification may provide the user with at least one option with respect to the event. Additionally, the notification may indicate to the user the dynamically altered rating. In some cases, the notification may also include information indicating a lower tariff may be applicable for the next several minutes or hours.

Once the notification has been sent to the user, it is determined whether a response is received from the user. See operation 318. If it is determined that a response is received by the user, the user selected option is satisfied in fulfillment of the request. See operation 320.

For example, if the response from the user indicates acceptance of the proposed dynamic rating, the rating may be dynamically altered. See operation 322. If the notification indicates that the user does not accept the rating, the rating may not be altered.

In another case, the notification may indicate that the user has accepted another option presented in the notification (e.g. downloading data at a specific time, etc.). In this case, the selected option may be satisfied in fulfillment of the request.

Figure 4:
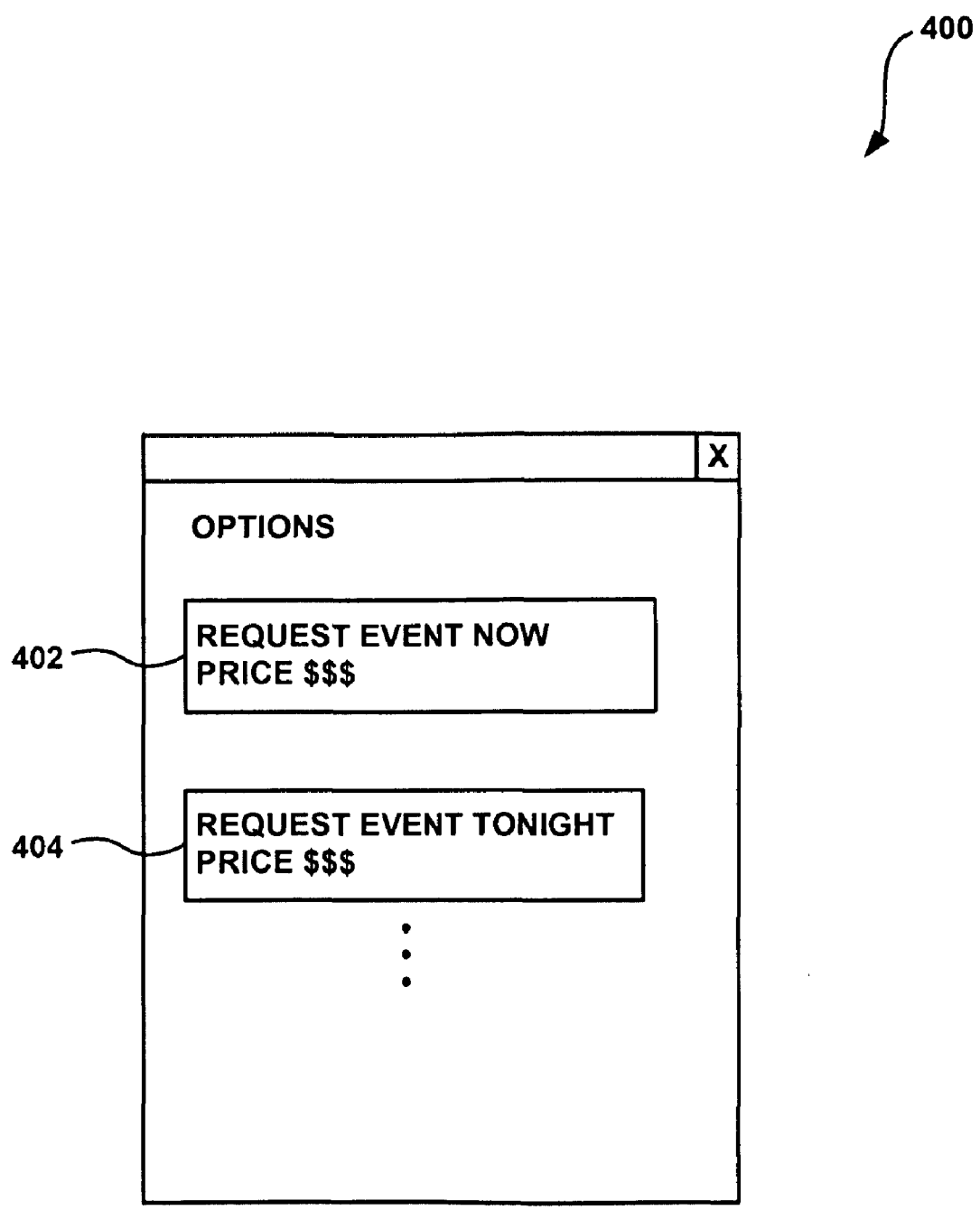
FIG. 4 shows an interface for notifying a user of a potential alteration of a rating based on network conditions, in accordance with one embodiment.

FIG. 4 shows an interface 400 for notifying a user of the potential alteration of a rating based on network conditions, in accordance with one embodiment. As an option, the interface 400 may be implemented in the context of the details of FIGS. 1-3. Of course, however, the interface 400 may be implemented in any desired environment. Once again, the aforementioned definitions may apply during the present description.

As shown, the interface 400 may include a plurality of user options 402-404 for requesting an event or selecting a rating associated therewith. The options 402-404 may include any options corresponding to a rating change associated with an event. For example, the options 402-404 may include an option to implement an event immediately at a first rate. Additionally, the options 402-404 may include an option to implement an event at a later time at a second rate.

Using the interface 400, the user may request the event by pressing a button associated with the event. In one embodiment, the user may have the ability to select a presented option and press a button indicating the acceptance of that option. Additionally, a button may be presented to the user such that the user may decline the presented options.

Figure 5:
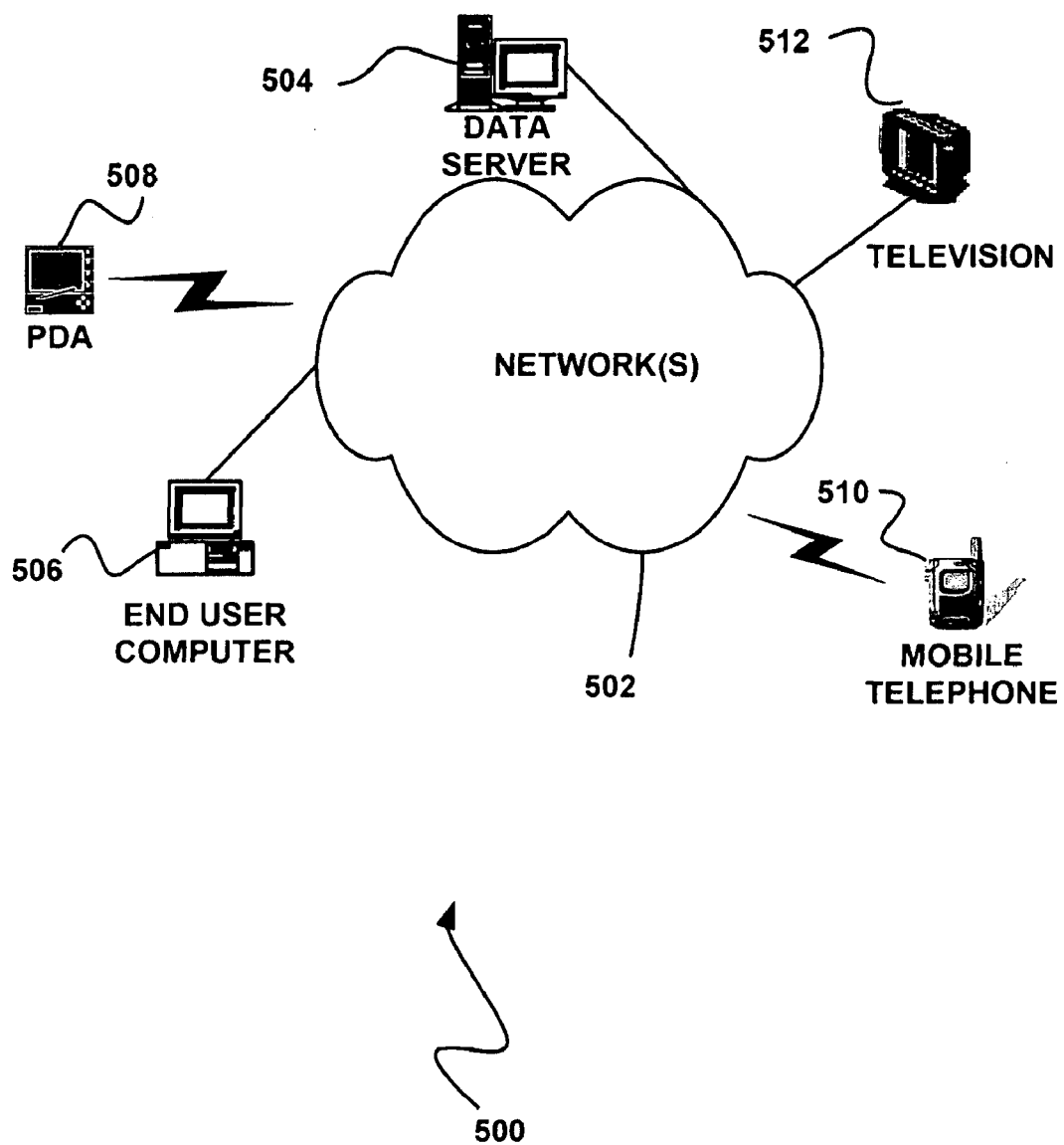
FIG. 5 illustrates a network architecture, in accordance with one embodiment.

FIG. 5 illustrates a network architecture 500 in which the various architecture and/or functionality of the various previous embodiments may be implemented. As shown, at least one network 502 is provided. In the context of the present network architecture 500, the network 502 may take any form including, but not limited to a telecommunications network, a local area network, a wireless network, a wide area network such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
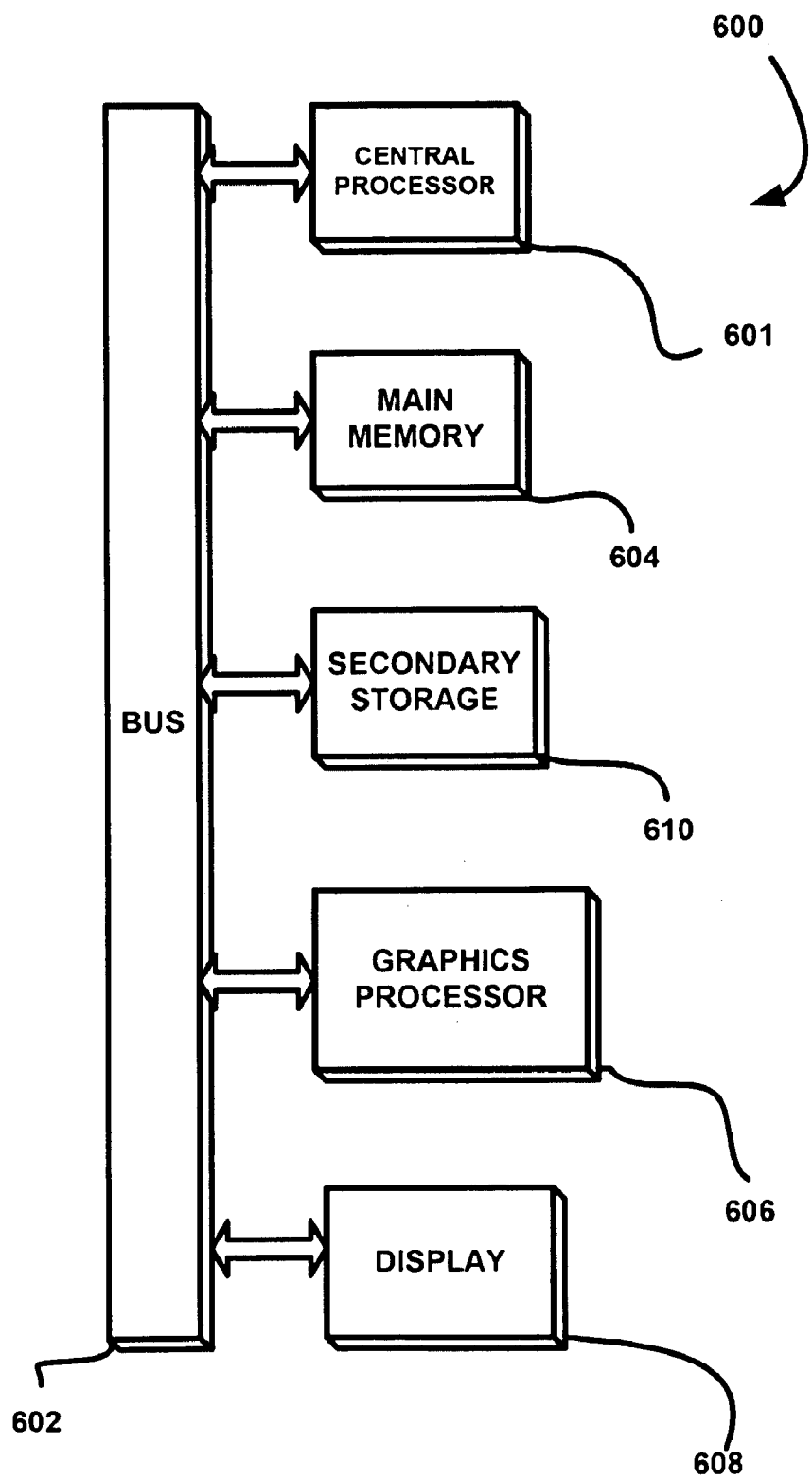
FIG. 6 illustrates an exemplary system, in accordance with one embodiment.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant device, a mobile phone device, a television, etc.

Further, while not shown, the system 600 may be coupled to a network (e.g. a telecommunications network, local area network, wireless network, wide area network such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for identifying a first rate associated with an event agreed upon by a user and a service provider;
   computer code for identifying a request for the event from the user;
   computer code for identifying at least one aspect of a condition of a network in response to the request for the event, the identification of the at least one aspect of the condition of the network occurring before the event occurs and including determining a portion of the network associated with the event, wherein the at least one aspect of the condition of the network that is identified before the event occurs includes a load on the network;
   computer code for comparing the load on the network to a threshold indicating a low amount of use;
   computer code for determining a second rate associated with the event in response to the comparison indicating that the load on the network is below the threshold indicating the low amount of use, wherein the second rate is less than the first rate associated with the event and agreed upon by the user and the service provider;
   computer code for identifying each of a user preference of the user, a type of the event, and a difference between the first rate and the second rate associated with the event;
   computer code for determining that a notification is to be sent to the user that requested the event, the notification regarding the second rate associated with the event, wherein it is determined that the notification is to be sent to the user that requested the event based on the user preference of the user, the type of the event, and the difference between the first rate and the second rate associated with the event;
   computer code for sending the notification to the user that requested the event, wherein the notification sent to the user indicates:
      the second rate associated with the event that is lower than the first rate associated with the event,
      a limited time period for which the second rate that is lower than the first rate is effective, and
      a current rate discount available for a second type of event different than the type of the event requested by the user; and
   computer code for rating the event at the second rate associated with the event in place of the first rate associated with the event and agreed upon by the user and the service provider in response to the comparison indicating that the load on the network is below the threshold indicating the low amount of use.

2. The computer program of claim 1, wherein the event includes a voice call.

3. The computer program of claim 1, wherein the event includes a data transmission.

4. The computer program of claim 1, wherein the notification provides the user with at least one option with respect to the event.

5. A method, comprising:
   identifying a first rate associated with an event agreed upon by a user and a service provider;
   identifying a request for the event from the user;
   identifying, utilizing at least one processor, at least one aspect of a condition of a network in response to the request for the event, the identification of the at least one aspect of the condition of the network occurring before the event occurs and including determining a portion of the network associated with the event, wherein the at least one aspect of the condition of the network that is identified before the event occurs includes a load on the network;
   comparing, utilizing the at least one processor, the load on the network to a threshold indicating a low amount of use;
   determining, utilizing the at least one processor, a second rate associated with the event in response to the comparison indicating that the load on the network is below the threshold indicating the low amount of use, wherein the second rate is less than the first rate associated with the event and agreed upon by the user and the service provider;
   identifying each of a user preference of the user, a type of the event, and a difference between the first rate and the second rate associated with the event;
   determining, utilizing the least one processor, that a notification is to be sent to the user that requested the event, the notification regarding the second rate associated with the event, wherein it is determined that the notification is to be sent to the user that requested the event based on the user preference of the user, the type of the event, and the difference between the first rate and the second rate associated with the event;
   sending the notification to the user that requested the event, utilizing the least one processor, wherein the notification sent to the user indicates:
      the second rate associated with the event that is lower than the first rate associated with the event,
      a limited time period for which the second rate that is lower than the first rate is effective, and
      a current rate discount available for a second type of event different than the type of the event requested by the user; and
   rating the event at the second rate associated with the event in place of the first rate associated with the event and agreed upon by the user and the service provider in response to the comparison indicating that the load on the network is below the threshold indicating the low amount of use.

6. An apparatus, comprising:
   a processor for:
      identifying a first rate associated with an event agreed upon by a user and a service provider,
      identifying a request for the event from the user,
      identifying at least one aspect of a condition of a network in response to the request for the event, the identification of the at least one aspect of the condition of the network occurring before the event occurs and including determining a portion of the network associated with the event, wherein the at least one aspect of the condition of the network that is identified before the event occurs includes a load on the network, comparing the load on the network to a threshold indicating a low amount of use, determining a second rate associated with the event in response to the comparison indicating that the load on the network is below the threshold indicating the low amount of use, wherein the second rate is less than the first rate associated with the event and agreed upon by the user and the service provider,
      identifying each of a user preference of the user, a type of the event, and a difference between the first rate and the second rate associated with the event, determining that a notification is to be sent to the user that requested the event, the notification regarding the second rate associated with the event, wherein it is determined that the notification is to be sent to the user that requested the event based on the user preference of the user, the type of the event, and the difference between the first rate and the second rate associated with the event, sending the notification to the user that requested the event, wherein the notification sent to the user indicates:

the second rate associated with the event that is lower than the first rate associated with the event, a limited time period for which the second rate that is lower than the first rate is effective, and a current rate discount available for a second type of event different than the type of the event requested by the user, and rating the event at the second rate associated with the event in place of the first rate associated with the event and agreed upon by the user and the service provider in response to the comparison indicating that the load on the network is below the threshold indicating the low amount of use.

7. The apparatus of claim 6, wherein the processor remains in communication with memory via a bus.

8. The computer program of claim 1, wherein the computer program is operable such that if the at least one aspect of the condition of the network includes a high load on the network, the user is offered an opportunity to receive a deferred download in response to the request for the event in exchange for a discounted rate.

9. The computer program of claim 8, wherein the computer program is operable such that if the user accepts the offer, the deferred download is scheduled at a particular time and a rating is dynamically established for the deferred download.

10. The computer program of claim 1, wherein online charging components of a real-time service delivery system detect information about the load on the network, and use the detected information to determine when the load on the network is below the threshold indicating the low amount of use.

11. The computer program of claim 10, wherein the detected information about the load on the network is used to determine when network usage is outside of a typical range of usage and whether the network usage is disabled at a geographical location.

12. The computer program of claim 1, wherein usage trends developed in addition to data indicating whether network use is increasing or decreasing are utilized in sending the notification to the user.

13. The computer program of claim 1, wherein the event request includes a voice call, and the notification is sent to a device used to initiate the call.

14. The computer program of claim 1, wherein the notification includes an automated voice notification.

15. The computer program of claim 1, wherein the notification includes a voice prompt for a response by the user.

16. The computer program of claim 1, further comprising determining a geographical location where the network is damaged or disabled, based on the at least one aspect of the condition of the network.

17. The computer program of claim 1, wherein the event is a download, and the notification is sent to a device where the request for the event was initiated.

18. The computer program of claim 1, wherein the limited time period is a period of minutes, such that the notification indicates that the second rate associated with the event is available for the period of minutes, and at least one additional event of the type of the requested event is requested by the user during the period of minutes and rated at the second rate.

* * * * *